United States Patent
Ogawa

(10) Patent No.: US 6,639,881 B2
(45) Date of Patent: Oct. 28, 2003

(54) DISC REPRODUCTION DEVICE

(75) Inventor: Motoharu Ogawa, Gunma-ken (JP)

(73) Assignee: Victor Company of Japan, Limited, Yokohama (JP)

(*) Notice: Subject to any disclaimer, the term of this patent is extended or adjusted under 35 U.S.C. 154(b) by 284 days.

(21) Appl. No.: 09/931,023

(22) Filed: Aug. 17, 2001

(65) Prior Publication Data

US 2002/0024896 A1 Feb. 28, 2002

(30) Foreign Application Priority Data

Aug. 30, 2000 (JP) .................................. P2000-261562

(51) Int. Cl.⁷ .............................................. G11B 17/26
(52) U.S. Cl. ................................................. 369/30.86
(58) Field of Search ........................... 369/30.85, 30.86, 369/30.79, 30.9

(56) References Cited

U.S. PATENT DOCUMENTS 4,996,680 A * 2/1991 Staar ...................... 369/30.71

FOREIGN PATENT DOCUMENTS

| JP | 6-101179 | 2/1994 |
| JP | 6-060520 | 3/1994 |
| JP | 9-326154 | 12/1997 |

* cited by examiner

Primary Examiner—George J. Letscher
(74) Attorney, Agent, or Firm—Nath & Associates PLLC; Gary M. Nath; Harold L. Novick

(57) ABSTRACT

Trays including disc mounting portions for mounting discs are divided into seven trays for each disc. Portions of the discs except for the disc positioned at a reproduction state overlap with adjacent discs. Accordingly, seven discs can be held despite that a diameter of an entire assembly including all seven trays rotatively moving around a central shaft is equal to that of a large tray of a conventional disc reproduction device of a carrousel type capable of holding five discs. The constitution also includes an interlocking mechanism of the discs, a sliding mechanism where the trays rotatively move around the central shaft horizontally and upward/downward obliquely while maintaining parallelism, and driver for providing a period of time in which trays at a middle stage in the beginning of one stroke and trays reaching the middle stage are still during a time period for one stroke.

4 Claims, 18 Drawing Sheets

DISC REPRODUCTION DEVICE

BACKGROUND OF THE INVENTION

The present invention relates to a disc reproduction device for a disc such as a CD (compact disc) and a DVD (digital versatile disc), more specifically, to a disc reproduction device of a carrousel type that can hold a plurality of discs.

Among the disc reproduction devices for the CD, the DVD and the like, aside from a reproduction device that holds and reproduces one disc, there exists a so-called disc changer that holds a plurality of discs at once and optionally selects one of them for reproduction. The disc changer has two types. One is a magazine type (also referred to as a cartridge type) where the discs are stacked in a box-shaped magazine. Another one is a carrousel type as shown in FIG. 1 where a plurality of discs (normally three to five discs) D1 to D5 (shaded areas) is placed flatways on disc mounting portions around a central shaft O at even intervals. The disc mounting portions are on a circular large tray 31 which rotates around the central shaft O on a table 30 of a drawer type as shown in the plan view of FIG. 1. The rotation of the tray 31 is controlled in order to move a desired disc to a reproduction unit 32 to reproduce the disc.

Since the above-described disc reproduction device of the carrousel type can selectively move the desired disc from the plurality of discs D1 to D5 to the position of the reproduction unit 32 only by controlling the rotation of the large tray 31, it has an advantage that a mechanical structure and control can be simpler than the disc reproduction device of the magazine type that requires a mechanism for selectively taking out a disc from the magazine.

However, the above-described large tray 31 needs an area where the plurality of discs D1, D2, D3 and so on, such as three or five discs, can be placed flatways around the central shaft O. Diameter of the large tray increases as the number of the discs thereof increases, and a width dimension and a depth dimension of the disc reproduction device become larger accordingly. For example, in the case of the CD or the DVD, the disc diameter is 12 cm. Thus, the diameter of the tray 31 for holding five discs as shown in FIG. 1 needs to be about 32 cm, which may be a limit of allowable maximum dimensions for a disc reproduction device for public use.

As a matter of course, it is preferable that a disc reproduction device can hold a large number of discs; therefore, it is required that as many discs as possible are held in the allowable dimensions.

Therefore, in the carrousel type disc reproduction device, an attempt has been proposed in which width and depth dimensions of the disc reproduction device are reduced by making a diameter of a tray small through making portions of a plurality of adjacent discs overlap with each other. On a tray 35 disclosed in Japanese Patent Publication No. 2729878 shown in the plan view of FIG. 2, three disc mounting portions 36a, 36b and 36c (concave portions that fit the dimensions of the discs D1 to D3) are arranged around the central shaft O at even intervals (interval of 120°) so as to overlap with each other (note that a clamping area K of each disc held is designed not to overlap). Thus, the diameter of the tray 35 is made to be smaller than the diameter of the trays where the discs are arranged without overlapping.

However, in the tray 35 of FIG. 2, since portions of all discs overlap with adjacent discs, exchange of the discs is considerably difficult, and there is a problem that the discs are easily scratched.

Since the discs remain overlapped in a reproduction state, there is little clearance with a reproduction unit, which is not mechanically safe and sure.

Therefore, the followings are required for the disc reproduction device of the carrousel type.

(1) As many discs as possible can be held.
(2) The width and depth dimensions of the device for installation, in other words, the diameter of the tray where the plurality of discs are mounted should be as small as possible.
(3) Exchange of the discs should be easy. In other words, the area above the disc at a disc exchange position should be open.
(4) The disc at a position for a reproduction state should not be overlapped with other discs both at the upper and lower portions.

SUMMARY OF THE INVENTION

The present invention has been created in consideration of the above-described circumstances. Accordingly, it is an object of the present invention to provide a disc reproduction device of a carrousel type that satisfies the foregoing requirements (1) to (4).

The present invention provides the followings to solve the above-described problems.

(1) A disc reproduction device 20 that comprises:
  a plurality of disc mounting portions arranged around a central shaft O, which holds discs D1 to D7 and is rotatively moved by a rotation drive mechanism; and a reproduction unit 32, where the plurality of disc mounting portions are rotatively moved around the central shaft O one stroke by one stroke, the one stroke being a movement of the disc mounting portion to a position of an adjacent disc mounting portion, and the reproduction unit 32 is set to reproduce the disc D1 held in the disc mounting portion positioned on the reproduction unit 32,
  in which the disc mounting portions include: independent trays 1 to 7 (a first tray to a seventh tray) divided for each disc; and driver for moving each of the trays 1 to 7 horizontally or upward/downward obliquely in a parallel manner around the central shaft O with every stroke of movement such that each of the trays 1 to 7 is at a bottom stage (PP) when being at a reproduction position which is on the reproduction unit 32 and is not overlapping with other trays, is at a top stage when being at a disc exchange position (EP), and is at a middle stage (WP) or the bottom stage (PP) during other standby state and a portion of each of the trays overlaps with an adjacent tray.

(2) The disc reproduction device 20 according to the foregoing (1), that comprises:
  an inner gear 16 formed on the inner circumference side of each of the trays 1 to 7 each having a fan-shaped form with identical shape and dimensions, which engages with a gear 17 or a gear 18 of a drive source;
  a protruding portion 14 projecting downward from a center of a lower surface of the inner circumference side of each of the trays; and
  a convex portion 15 for regulating a rotation path, horizontally protruding toward the outer circumference side and the inner circumference side of each of the trays, which is provided as the driver for moving each of the trays horizontally or upward/downward obliquely in the parallel manner around the central shaft O,
  in which the inner gear 16 of the tray positioned at the top stage (EP) and the bottom stage (PP) is engaged with the gear 17 or the gear 18 of the drive source severally arranged at specified positions and is driven, and other trays that are not directly driven include: an interlocking mechanism where the adjacent tray abuts and moves a side surface or the protruding portion 14 of the tray; and a sliding mechanism where each tray rotates around the central shaft O while the convex portion 15 is supported on orbits R1 and R2 to maintain a horizontal state.

(3) The disc reproduction device 20 according to the foregoing (1) or (2), in which the tray positioned at the middle stage (WP) in the beginning of the movement of one stroke and the tray to be moved to the middle stage (WP) comprise driver for providing the trays thereof a period of time in which the trays are still within a moving time of one stroke.

DETAILED DESCRIPTION OF THE PREFERRED EMBODIMENTS

Embodiments of a disc reproduction device according to the present invention will be described in detail with reference to the drawings. Note that the disc reproduction device generally includes a mechanical section such as an opening/closing mechanism of a table, a control section, a reproduction unit, a reproduction control section, an amplifier, and other electronic circuit sections. However, explanation of these sections is omitted because the constitution of these sections of the present invention is equivalent to those of a conventional device. Accordingly, description will be made only for trays and drive mechanism that are the characteristic of the present invention.

FIG. 3 to FIG. 18 are plan views, perspective views, side views and the like of the trays of the disc reproduction device of the present invention and the drive mechanism thereof.

Figure 1:
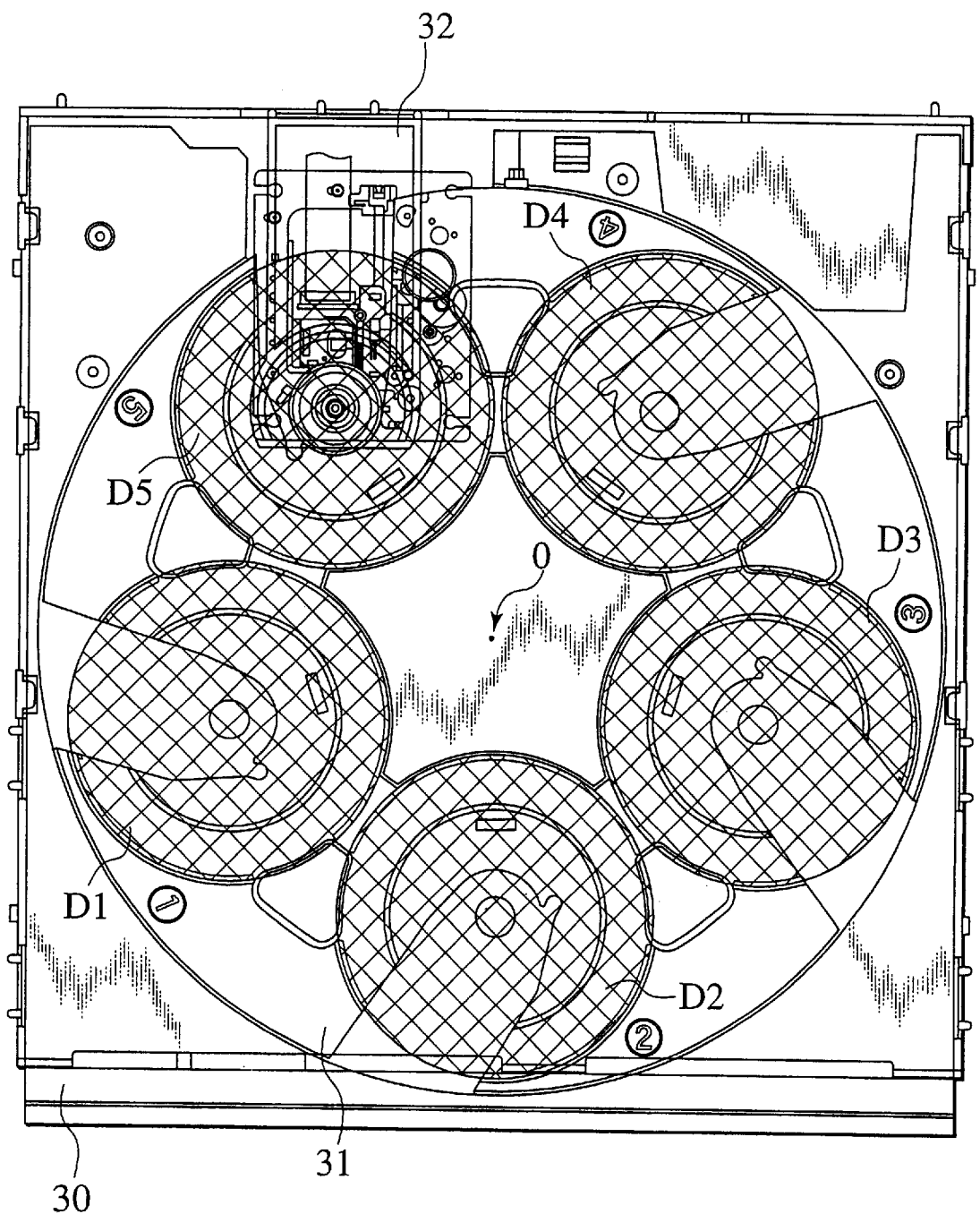
FIG. 1 is a plan view showing a state where discs are mounted on trays of a conventional disc reproduction device of a carrousel type.
Figure 2:
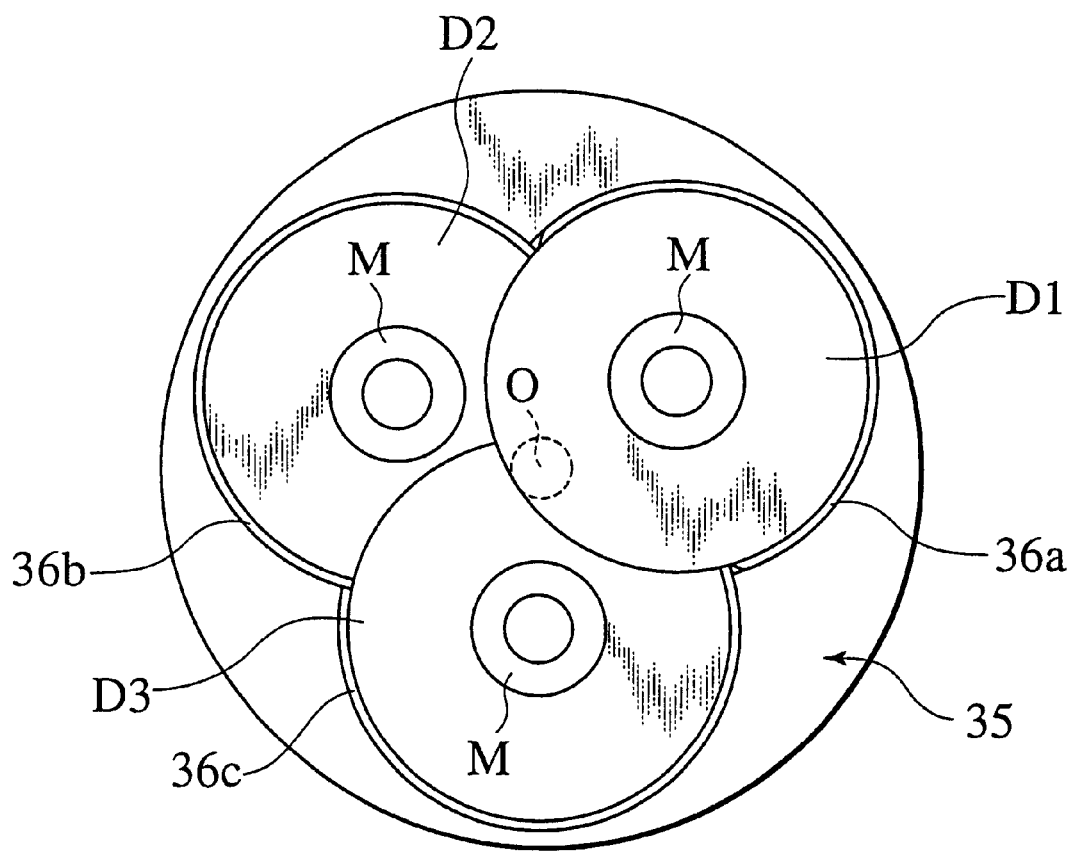
FIG. 2 is a plan view showing a state where the discs are mounted on a tray of a conventional disc reproduction device of a carrousel type, in which a portion of each disc overlaps with another disc.
Figure 3:
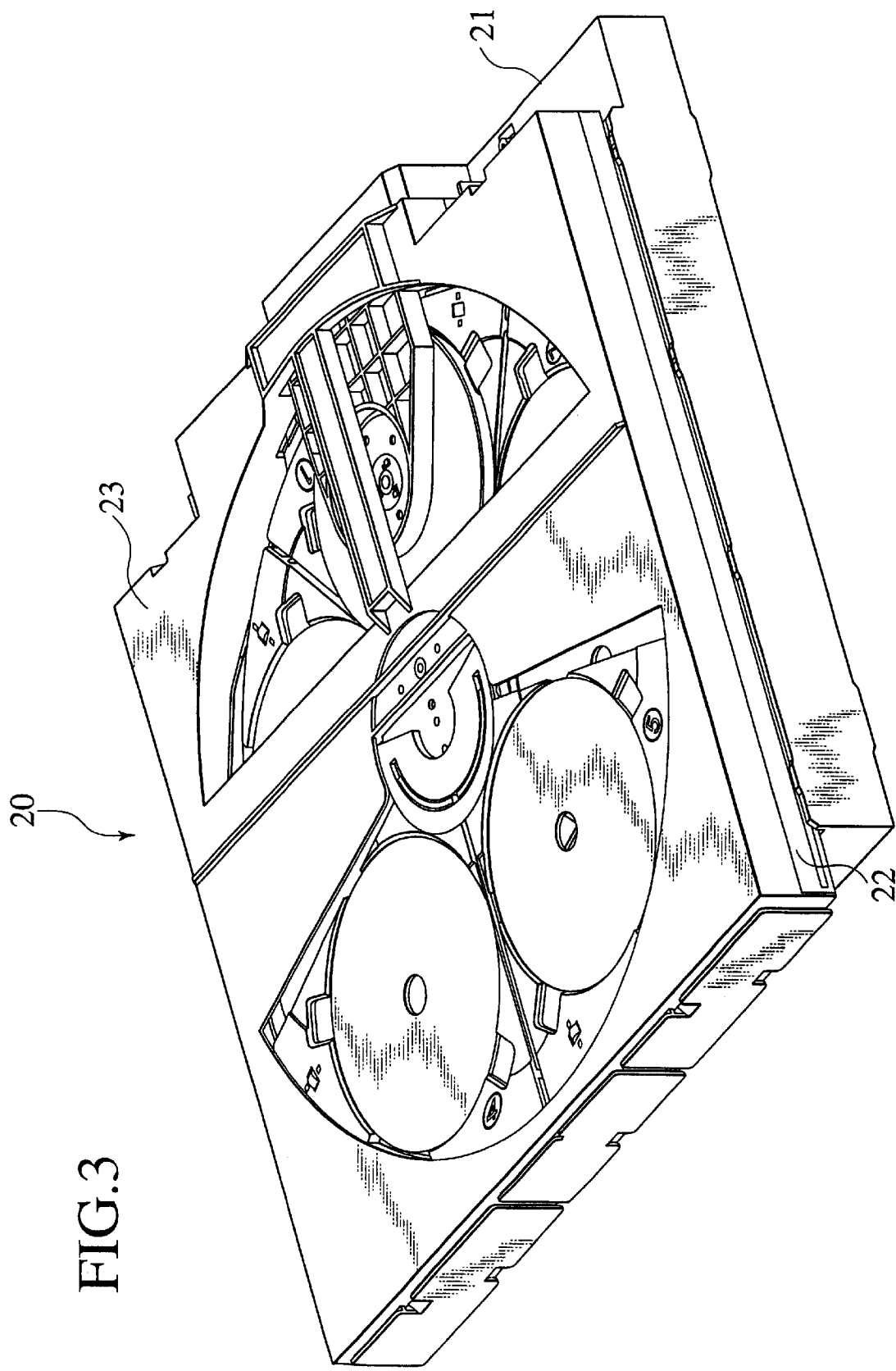
FIG. 3 is an entire perspective view of a disc reproduction device according to the present invention.

A disc reproduction device 20 according to the present invention has an external view of a disc changer of a carrousel type as shown in the perspective view of FIG. 3. The disc reproduction device possesses a tray structure as shown in the plan view of FIG. 4 and the perspective view of FIG. 5 when a cover 23 covering a table 22 on a base 21 is removed. The sum total of the tray structure is as follows. Trays including disc mounting portions for mounting discs D1 to D7 are divided into trays for a first tray to a seventh tray (corresponding to the discs D1 to D7) for each disc. The discs D2 to D7, except for the disc (D1 in FIG. 4) at a position for a reproduction state, are in a state where a portion of each disc overlaps with a portion of adjacent discs. Accordingly, the trays can hold seven discs even though a diameter of an entire assembly of the first tray to the seventh tray rotatively moving around the central shaft O is equal to that of a large tray 31 of the foregoing conventional disc reproduction device of a carrousel type (refer to FIG. 1) capable of holding five discs.

Structure of the disc reproduction device 20 will be described as follows. Firstly as the premise, the following points are the same as the foregoing disc changer of the carrousel type (refer to FIG. 1). The discs D1, D2 and so on are severally held by the plurality of disc mounting portions arranged around the central shaft O, which are rotated by a general rotation drive mechanism. The plurality of disc mounting portions are rotatively moved around the central shaft O one stroke by stroke, the one stroke being a movement of the disc mounting portion to a position of an adjacent disc mounting portion. A reproduction unit 32 (not shown) is set from underneath of the disc D1 to reproduce the disc D1 held in the disc mounting portion positioned on the reproduction unit 32 under a damper 19. Now, the structure of the disc reproduction device 20 is characterized in that the disc mounting portions include: independent trays 1 to 7 (a first tray to a seventh tray, a number is given to each tray in FIG. 4) divided for each disc; and the driver for moving each of the trays 1 to 7 horizontally or upward/downward obliquely in a parallel manner around the central shaft O in one stroke of movement. With the driver, each of the trays 1 to 7 is at a bottom stage (PP) when being at a reproduction position (the first tray with the disc D1 mounted in the initial state of FIG. 4) on the reproduction unit 32 and does not overlap with other trays, as shown in FIG. 6, is at a top stage (EP) with regard to the trays (the fourth tray and the fifth tray in the initial state of FIG. 4) when being at a disc exchange position, and is at a middle stage (WP) or the bottom stage (PP) during other standby state (a stop position in a state where the tray is not at the reproduction position nor the exchanging position) and a portion of the tray (a half of the disc surface) overlaps with adjacent trays as shown in the plan view of FIG. 4 and the perspective view of FIG. 5. It is noted that, as apparent from FIG. 4, angular spaces between the discs around the central shaft at the stop position are not even due to the partial overlap of the discs. Therefore, an angle of movement made by the next stroke is not uniform depending on the stop position of the foregoing trays 1 to 7, and the angle is either 72° or 36°.

Figure 11:
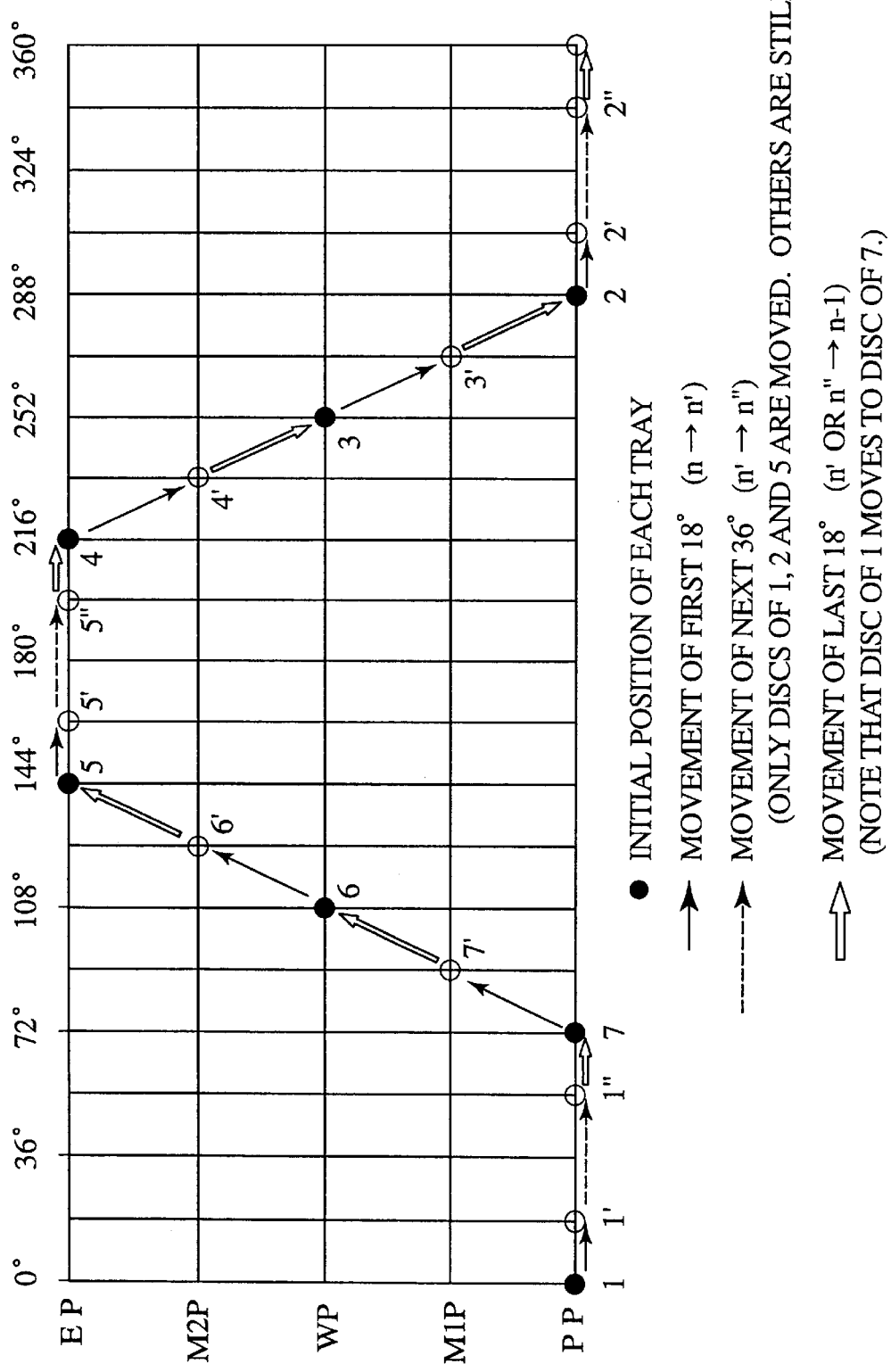
FIG. 11 is a graph showing movement of each of the discs 1 to 7 upon changing one disc according to the present invention.
Figure 12:
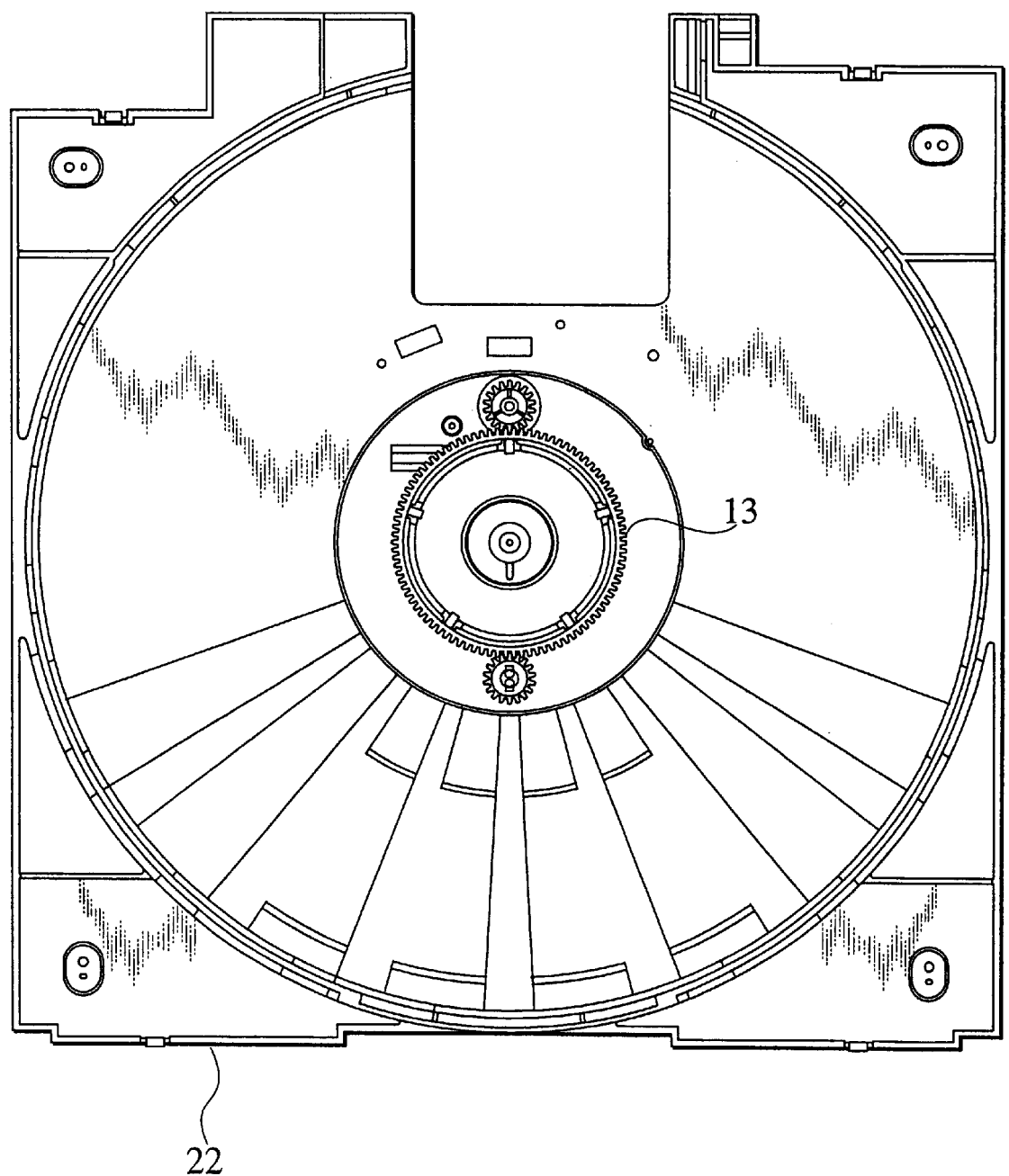
FIG. 12 is a plan view showing a drive mechanism under the trays of the disc reproduction device according to the present invention.
Figure 13:
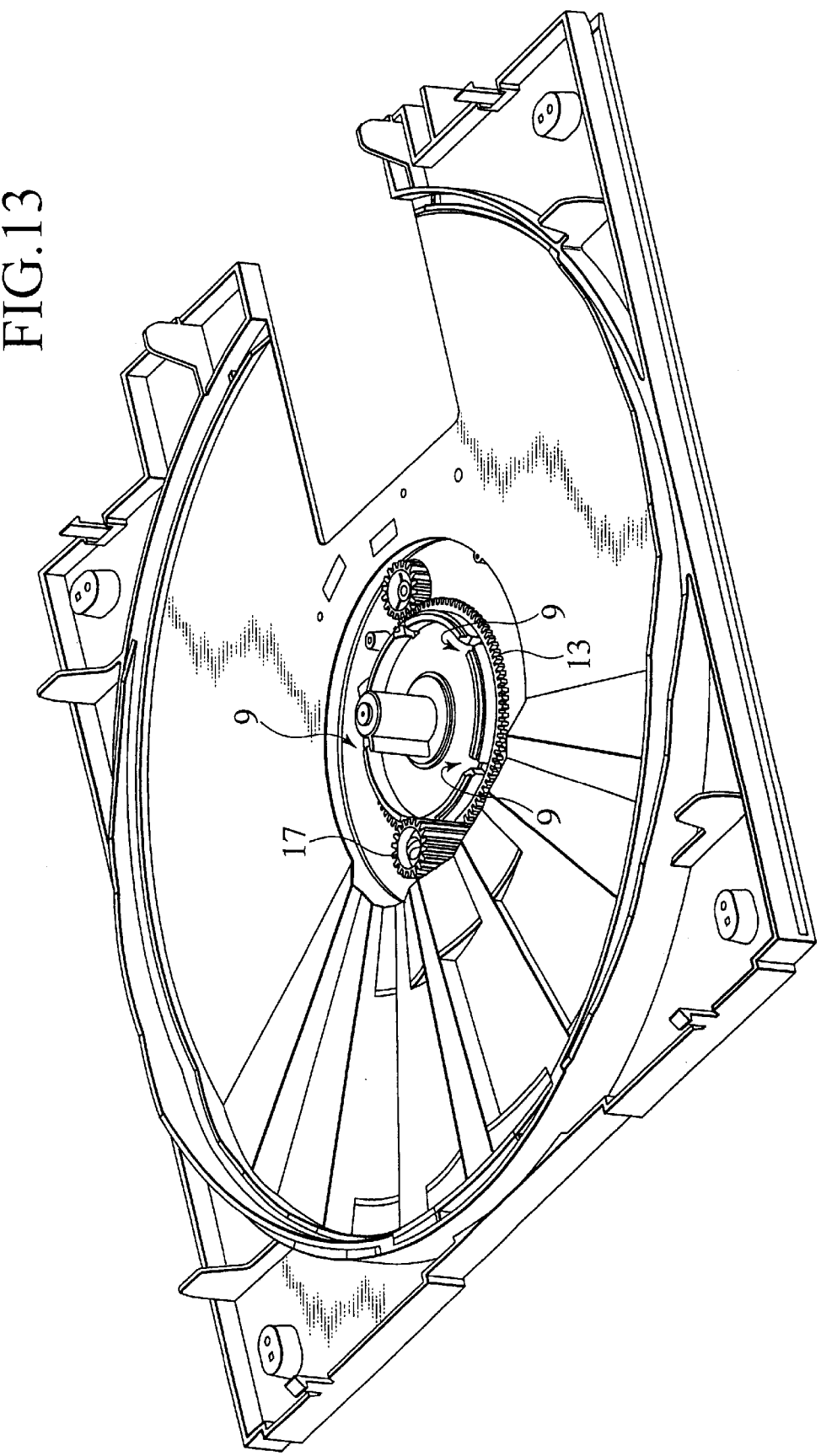
FIG. 13 is a perspective view of the above-described drive mechanism.

Next, description will be made for the movement of the trays 1 to 7 around the central shaft O. FIG. 11 is a graph explaining behaviors of the trays 1 to 7 in the movement of one stroke. A center of the first tray at the reproduction position is set as 0°, and angles from 0° to 360° divided with an interval of 18° are indicated on the axis of abscissas and height positions are indicated in five stages on the axis of ordinates. Herein, a reference code PP denotes the position of the bottom stage; M1P, the height of a first halfway stage in a moving process; WP, the height position of the standby state; M2P, the height of a second halfway stage; and EP, the top stage. The initial position of each tray is indicated as a black dot and a tray number. With the movement of one stroke from the initial state, the trays are moved in such a manner that the first tray at the black dot position (0°) moves to the position of the seventh tray, the second tray moves to the position of the first tray, and the third tray moves to the position of the second tray. A large gear 13 at the central shaft rotates by 72° in one stroke, but the movement of the trays in accordance with the rotation is divided in three steps.

In the graph, an arrow attached to a solid line shows the movement of the first 18°, an arrow attached to a broken line shows the movement of the next 36°, and an arrow in outline shows the movement of the last 18°.

The first, fifth and second trays rotate in total of 72° and respectively moves to the position of the adjacent but not overlapping trays, namely, the seventh, fourth and first trays.

On the other hand, the seventh, sixth, fourth and third trays move either to the first halfway stage (M1P) or to the second halfway stage (M2P) in the movement of the first 18°. However, the trays are still during the period of time for the next rotation by 36°, and reach the top stage (EP), the middle stage of the standby state (WP) or the bottom stage (PP) in the movement of the last 18°. In other words, the trays move only by 36° for the rotation drive of 72°.

Inevitably, the large gear 13 of the rotation drive mechanism operates by 504° in order for a certain tray to move in seven strokes (the movement of 360° for one cycle) and to return to its original position. This delaying mechanism of two strokes allows the tray to hold two more discs than the conventional tray.

Figure 4:
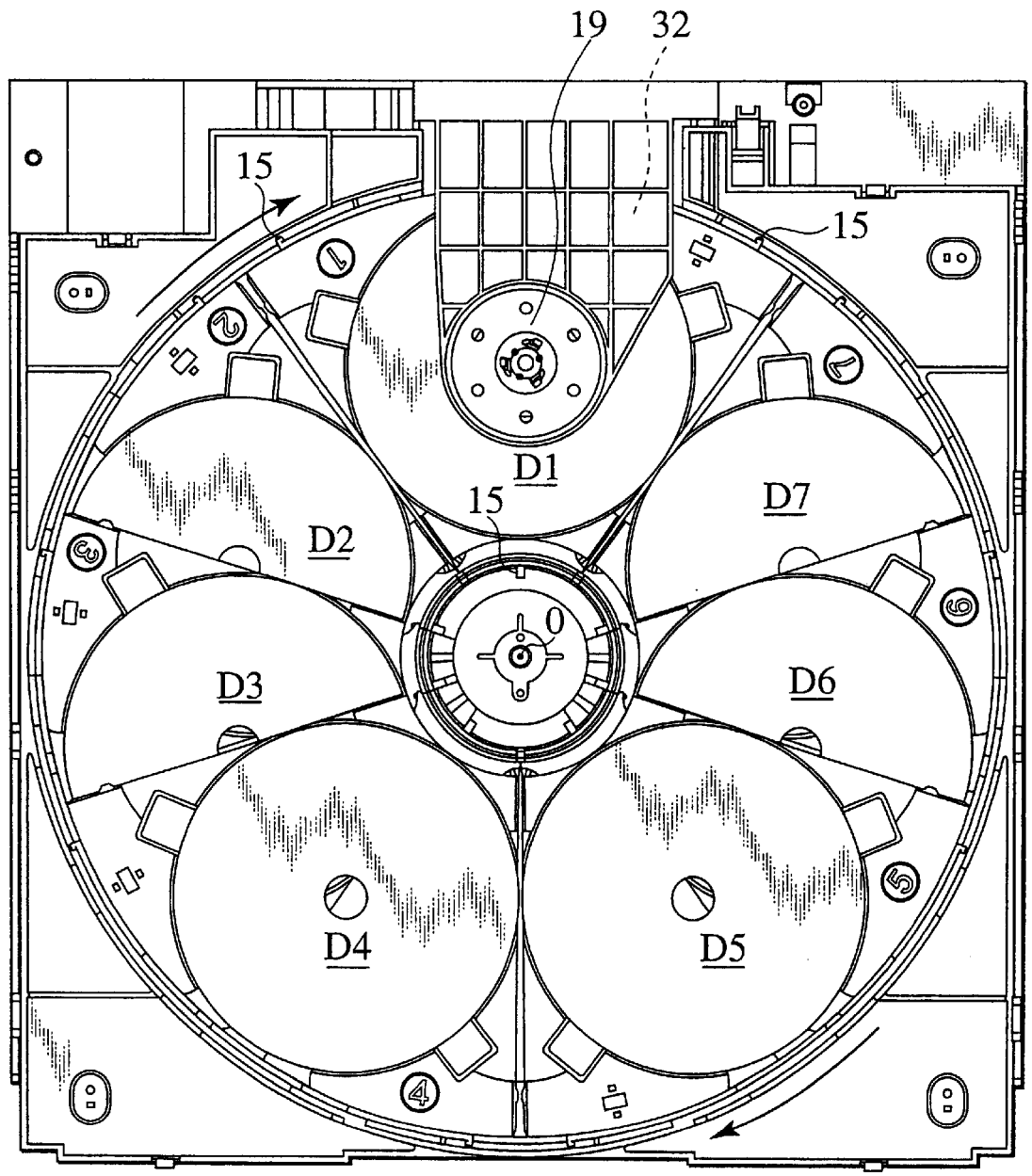
FIG. 4 is a plan view showing an initial positional state where discs are mounted on divided trays of the disc reproduction device, with a cover of the same removed.
Figure 5:
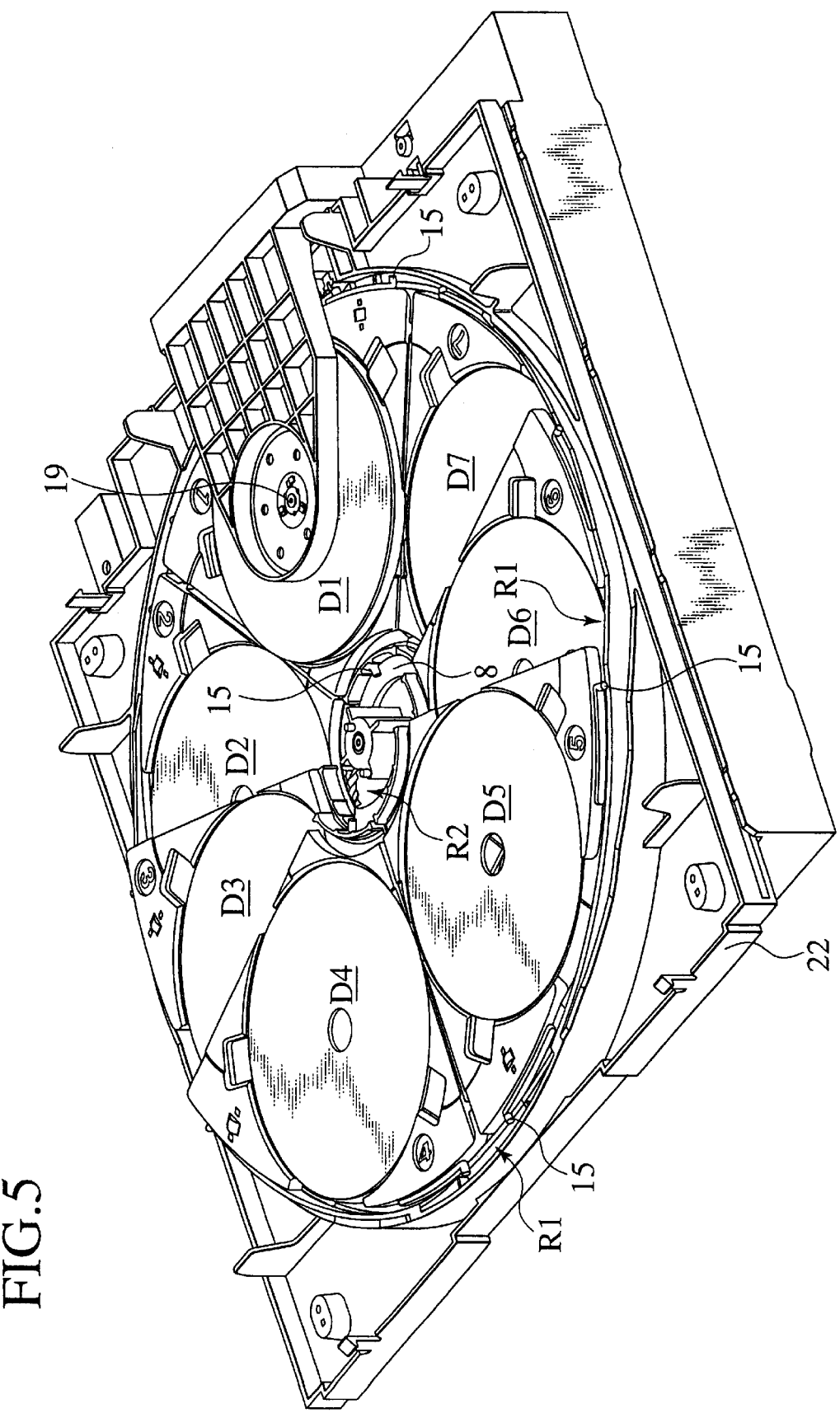
FIG. 5 is a perspective view of the above-described initial positional state.
Figure 6:
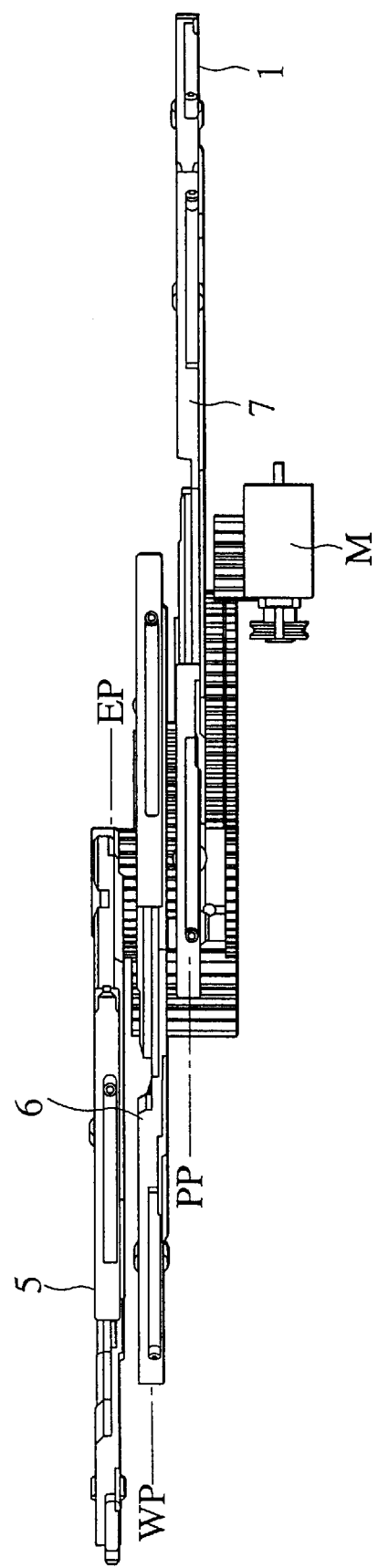
FIG. 6 is a view showing a vertical positional state of the trays in the above-described initial positional state viewed from the right side.
Figure 7:
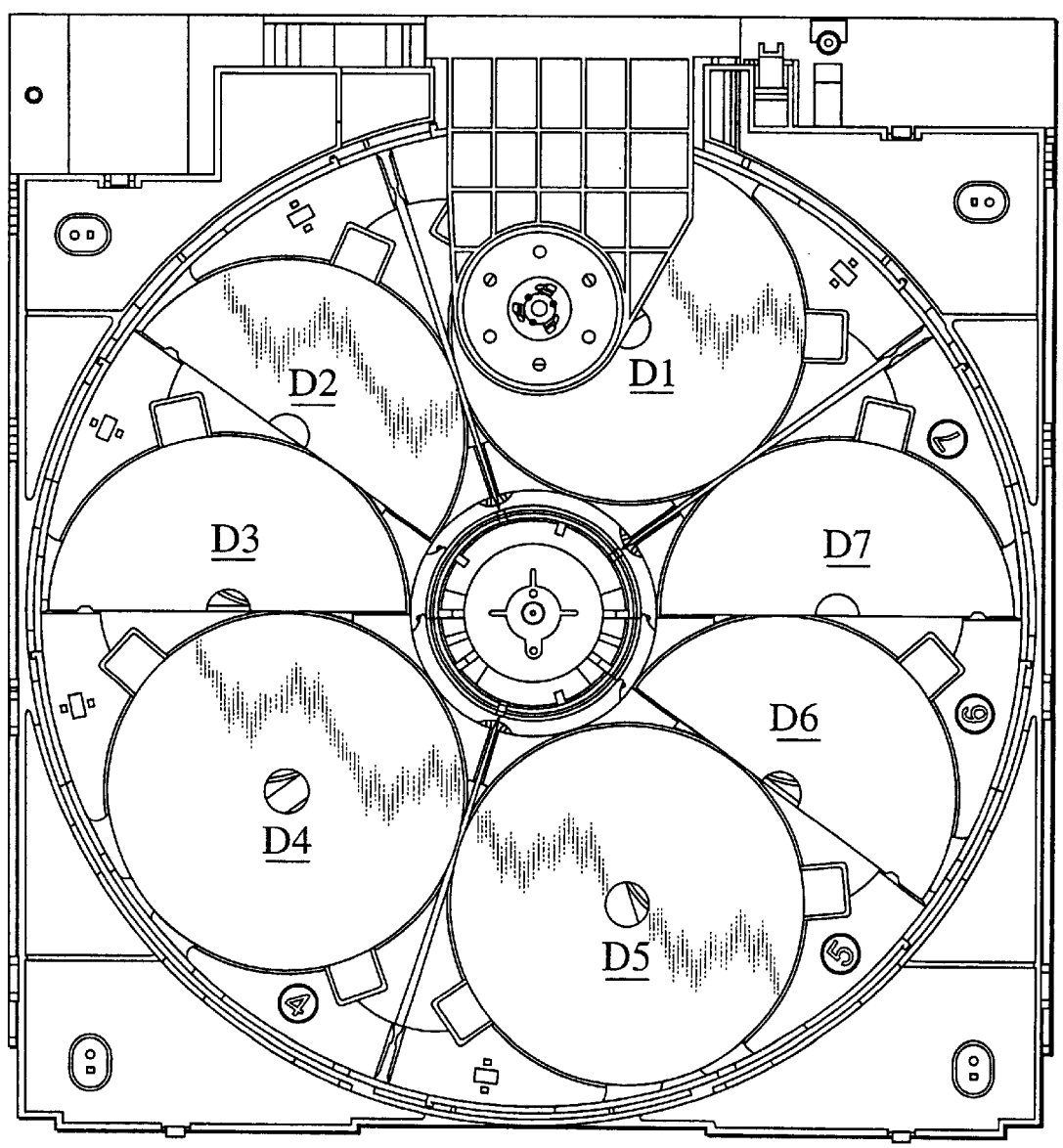
FIG. 7 is a plan view showing a positional state of each tray at a first step where each of the trays is moved by 18° from the initial positional state.
Figure 8:
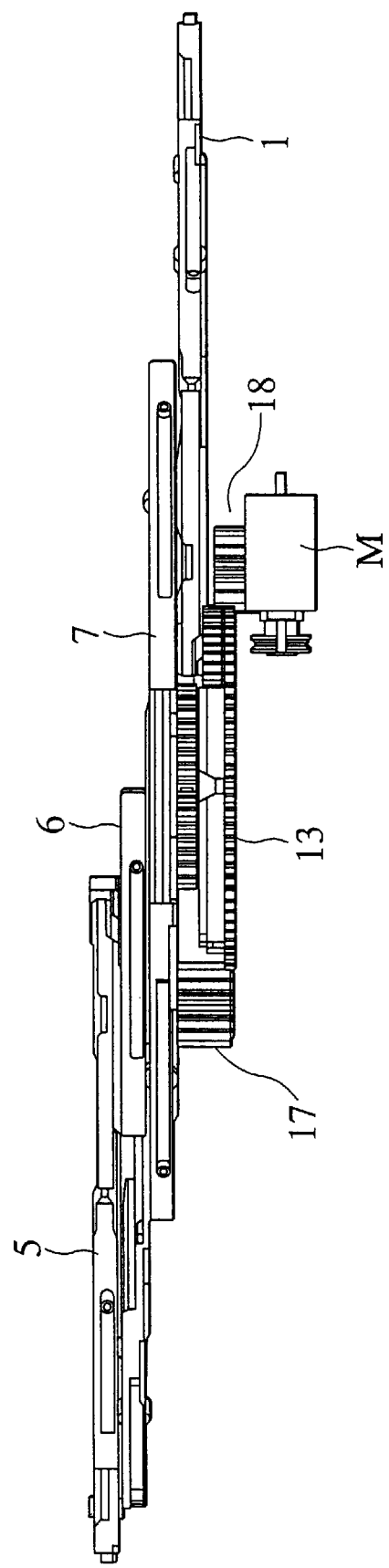
FIG. 8 is a view showing the vertical positional state of the trays in the above-described first step viewed from the right side.
Figure 9:
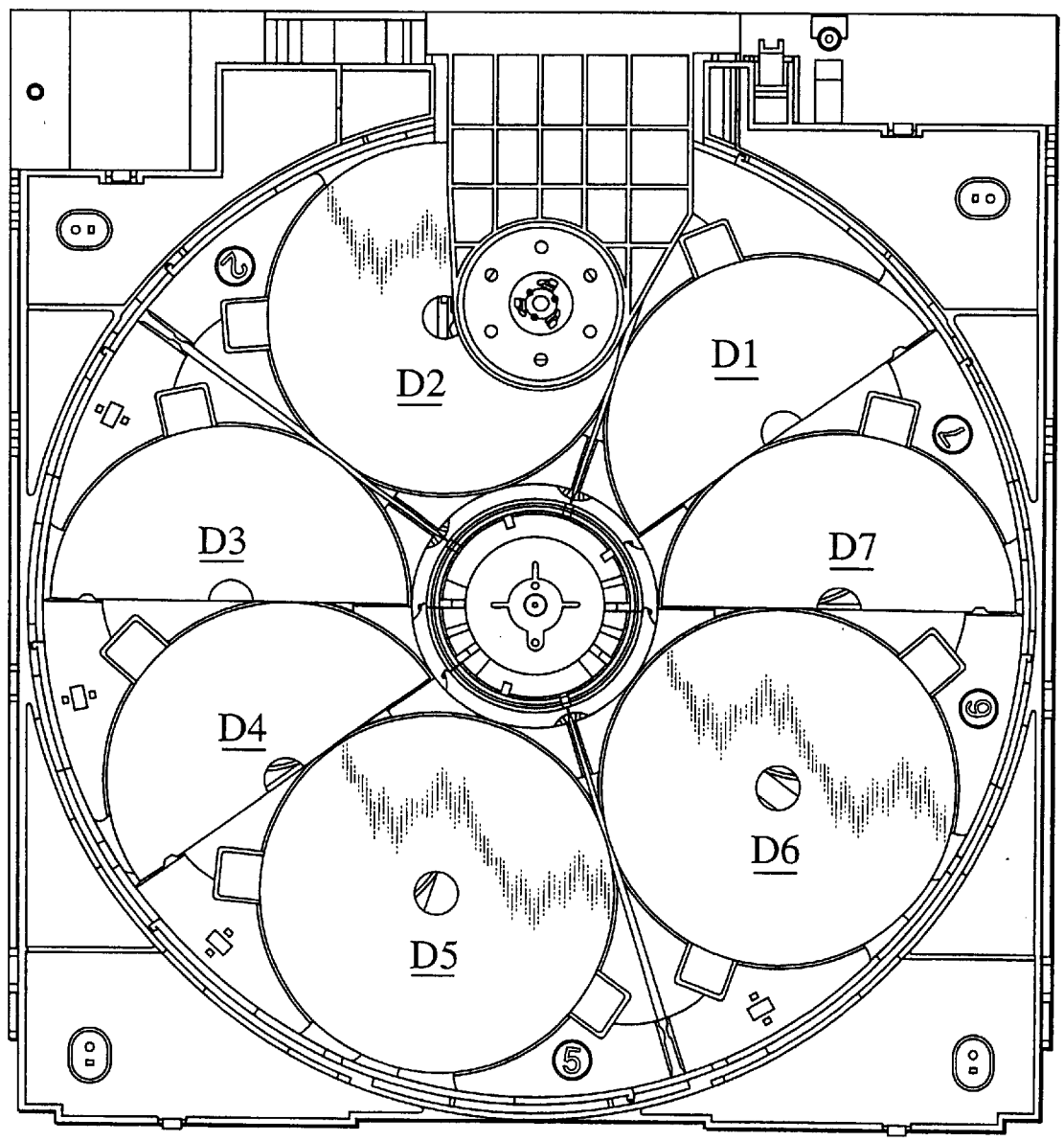
FIG. 9 is a plan view showing a positional state of each tray at a second step where each of the trays is moved by 36° from the above-described first step.
Figure 10:
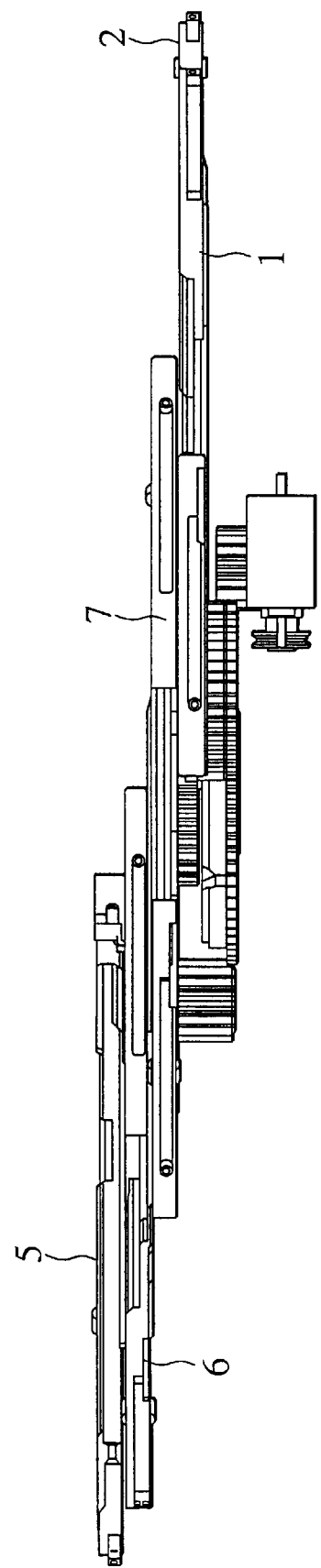
FIG. 10 is a view showing the vertical positional state of the trays in the above-described second step viewed from the right side.

The movement of each tray during the movement process in the foregoing one stroke is clearly demonstrated by the initial state shown in FIG. 4 to FIG. 6, by FIG. 7, by the state after the movement of the first 18° in FIG. 8, by FIG. 9, and by the state after the movement of the next 36° in FIG. 10.

Figures 18A, 18B, 18C, 18D:
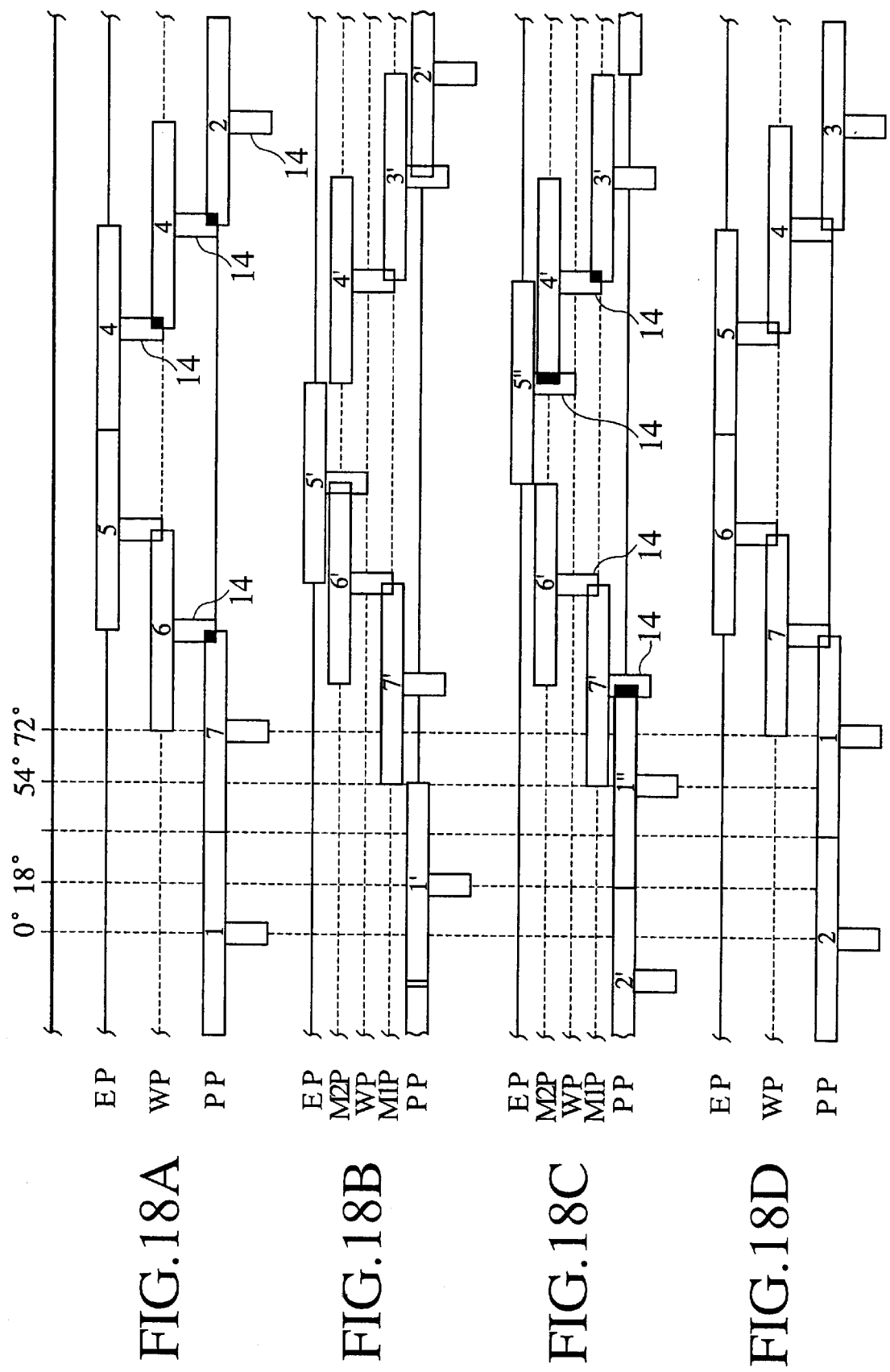
FIGS. 18A to 18D are views explaining a boss pushing mechanism for moving sub trays according to the present invention.

FIGS. 18A to 18D show the step-by-step behaviors of each tray 1 to 7 in the rotation movement in one stoke corresponding to the tray arrangement of FIG. 11, which is viewed from the side. FIG. 18A shows the initial position state, FIG. 18B shows the state after the movement of the first 18°, FIG. 18C shows the state after the movement of the next 36°, and FIG. 18D shows the state where the disc reached the position of the adjacent tray after the movement of the last 18°. Note that the trays subjected to direct rotation drive by the drive source are the trays at the top stage (EP) and the bottom stage (PP). The trays at the first halfway stage (M1P), the second halfway stage (M2P) and the middle stage in the standby state (WP) are not directly driven by the drive source, but are moved while being pushed by the adjacent tray.

In the movement of the first 18° from FIG. 18A to FIG. 18B, the first tray 1 pushes with its side surface the adjacent seventh tray 7, the seventh tray 7 pushes with its side surface the protruding portion 14 (areas colored in black) of the sixth tray 6 at the middle stage (WP), the fifth tray 5 is directly driven to push the adjacent fourth tray 4, the fourth tray 4 pushes with its protruding portion 14 the side surface of the third tray 3 at the middle stage in the standby state (WP), and the protruding portion 14 of the third tray 3 pushes the side surface of the second tray 2 at the bottom stage (PP). As a result, in the movement of the first 18°, all the trays 1 to 7 move from n to n' interlocking with each other; the seventh tray 7' and the third tray 3' are moved to the first halfway stage (M1P), and the sixth tray 6' and the fourth tray 4' are moved to the second halfway stage (M2P), all moving upward/downward obliquely in the parallel manner. Thus, the trays at the first halfway stage and the second halfway stage are off by one tray in a height direction.

Next, in the movement of 36° from FIG. 18B to FIG. 18C, the first tray 1' and the fifth tray 5' horizontally move to positions under the seventh tray 7' and above the fourth tray 4 respectively such that half portions of each of the trays overlap with each other. The second tray 2' also moves horizontally at the bottom stage (PP) (the position after the movement is shown by n"). On the other hand, the seventh tray 7', the sixth tray 6', the fourth tray 4' and the third tray 3' are still in this period of time.

Next, in the movement of the last 18° in one stroke from FIG. 18C to FIG. 18D, the second tray 2" moves horizontally to the position where the first tray was originally positioned, the first tray 1" moves horizontally to the position where the seventh tray was originally positioned and pushes with its side surface the protruding portion 14 (areas colored in black in the drawing) of the seventh tray 7', and then, the seventh tray 7' is obliquely moved upward in the parallel manner from the first halfway stage (M1P) to the middle stage in the standby state (WP). Similarly, the side surface of the seventh tray 7' pushes the protruding portion 14 of the sixth tray 6' at the second halfway stage (M2P) to move it to the top stage (EP) where the fifth tray was originally positioned. The fifth tray 5" moves horizontally, and with its protruding portion 14, moves the fourth tray downward obliquely in the parallel manner from the second halfway stage (M2P) to the middle stage in the standby state (WP), where the third tray was originally positioned. The protruding portion 14 of the fourth tray 4' pushes the side surface of the third tray 3' and moves it to the bottom stage (PP) where the second tray was originally positioned.

In the embodiment of the present invention, as described above, the trays that are at the middle stage in the standby state (WP) in the beginning of the period of time of the movement from FIG. 18B to FIG. 18C, and the trays reaching the middle stage (WP) after the movement are still in respect to the moving time for one stroke, or the period of time for the drive of 36° from FIG. 18B to FIG. 18C, to be precise. Thus, the movement of the trays in an overlapping manner is realized.

Next, the driver of the horizontal movement and the upward/downward oblique movement in the parallel manner of the foregoing trays 1 to 7 around the central shaft O will be described with addition of the following drawings. The plan view of the table and a drive system in FIG. 12, the perspective view of the same in FIG. 13, the plan view of the drive system and the trays viewed from the backside in FIG. 14, the bottom right perspective view thereof viewed from the backside in FIG. 15, the bottom left perspective view thereof viewed from the backside in FIG. 16, and the drawings showing a structure of the tray in FIG. 17A and 17B.

Figure 14:
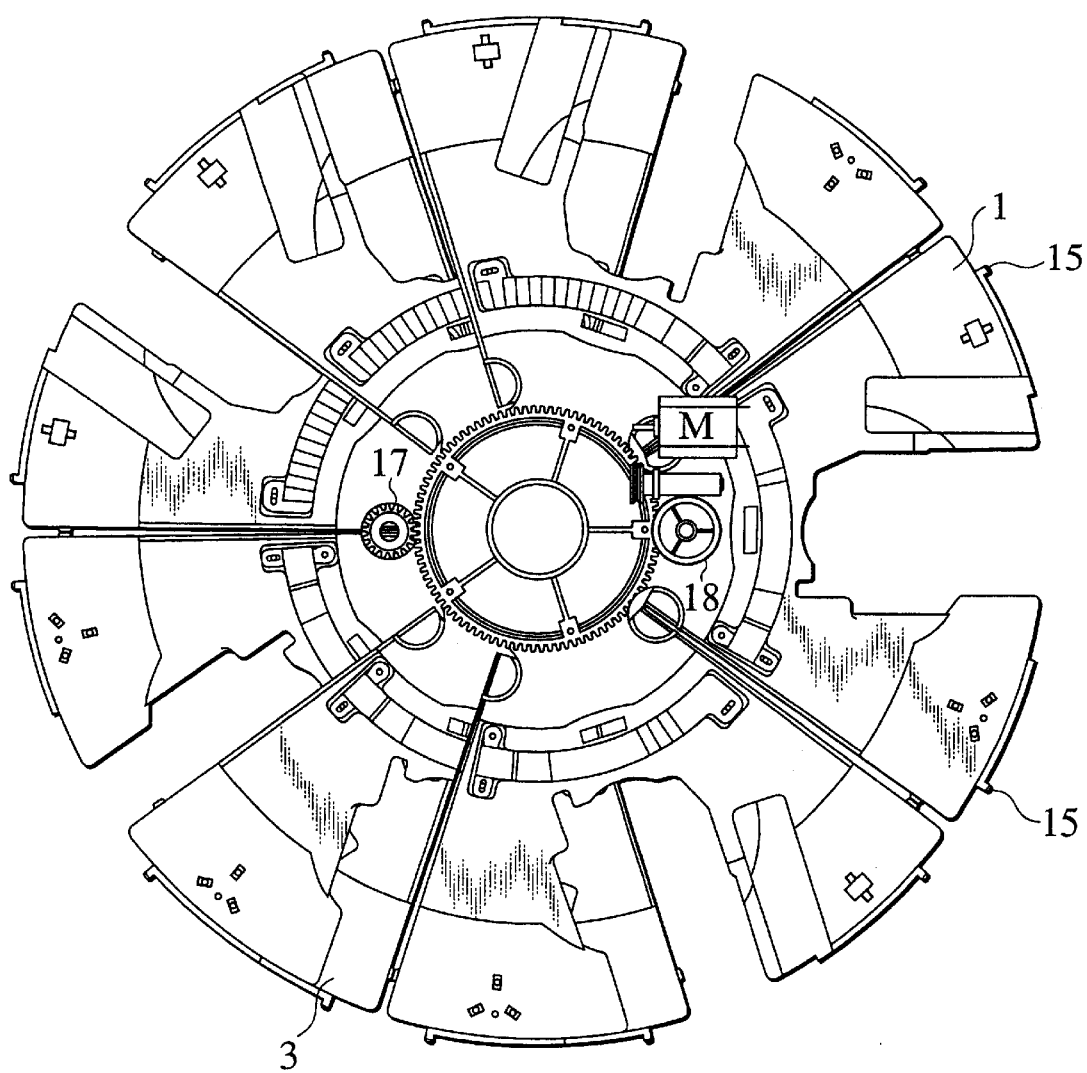
FIG. 14 is a view of the above-described drive mechanism viewed from the backside thereof.
Figure 15:
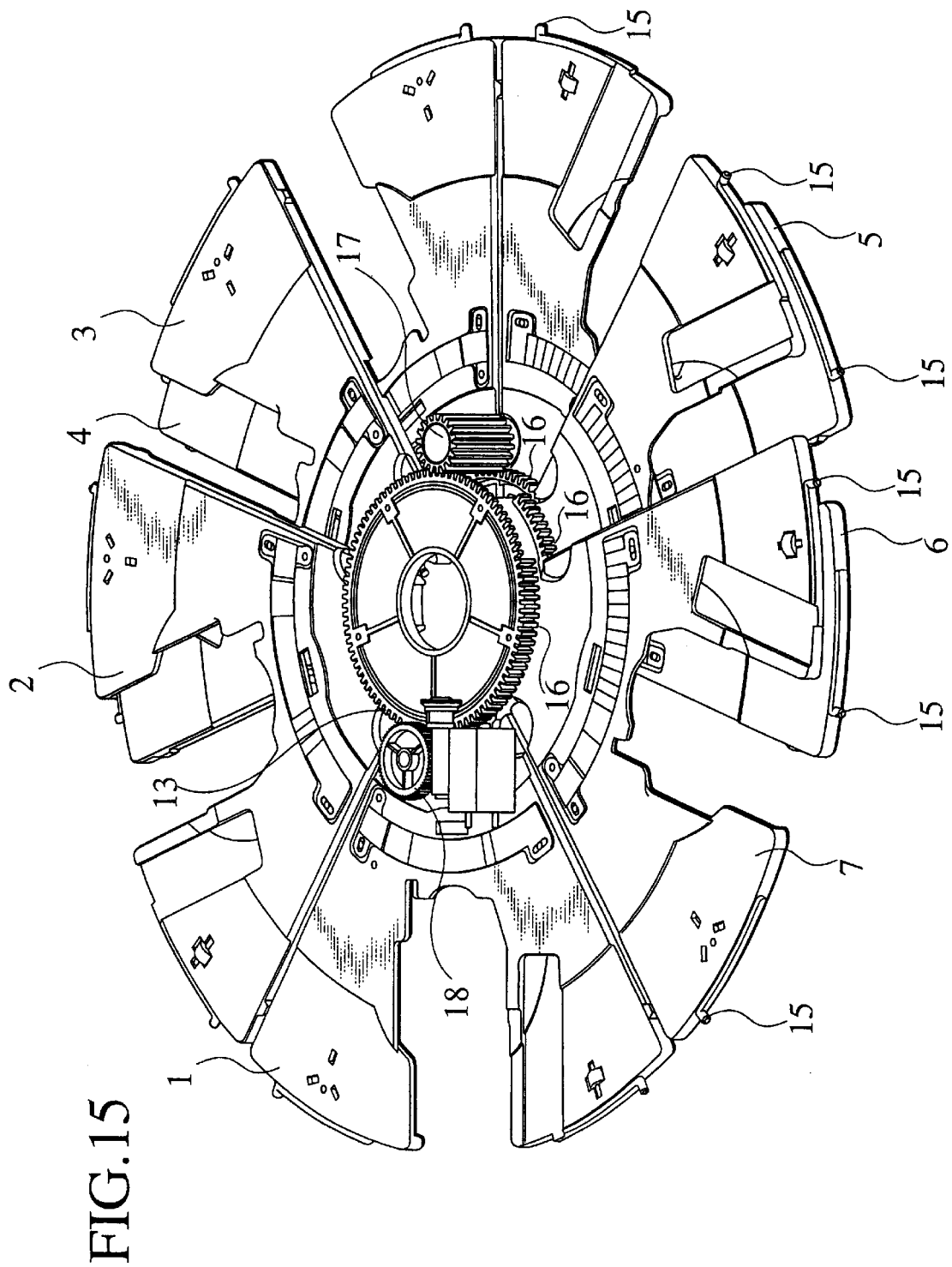
FIG. 15 is a perspective view of the above-described drive mechanism viewed from the bottom right side thereof.
Figure 16:
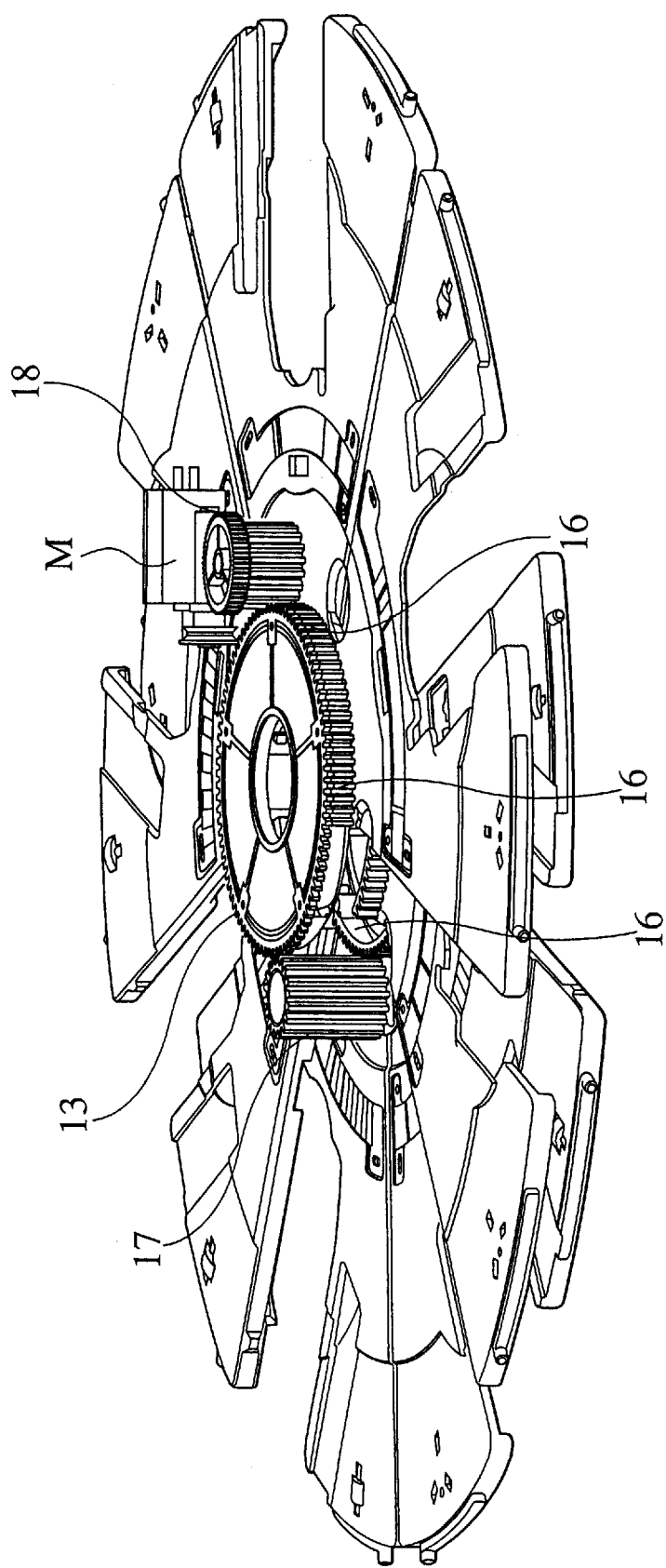
FIG. 16 is a perspective view of the above-described drive mechanism viewed from the bottom left side thereof.
Figure 17A:
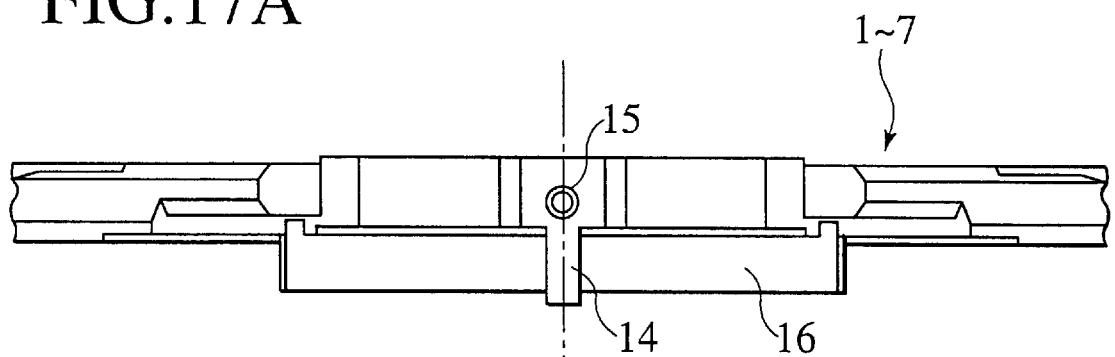
FIGS. 17A and 17B are enlarged plan views showing a structure of an inner circumference side of a fan-shaped tray according to the present invention.
Figure 17B:
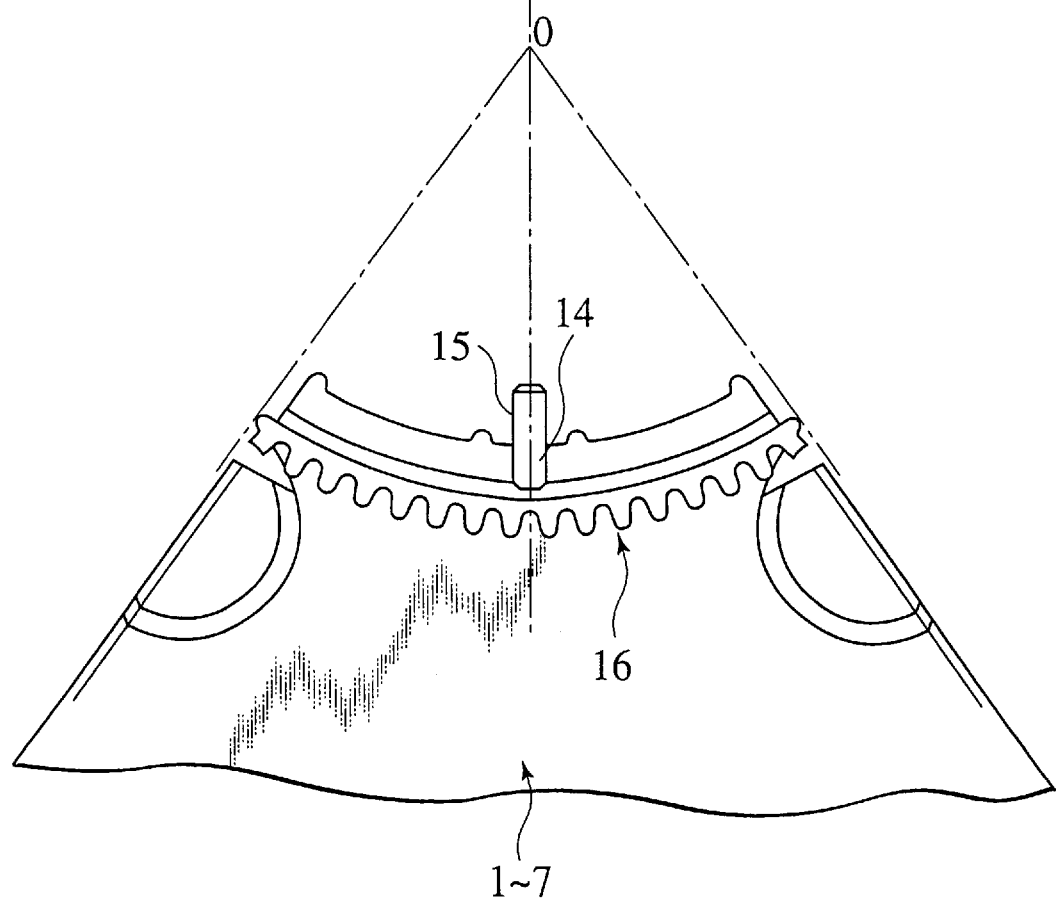

Firstly, an inner gear 16 (its diameter is as the same as that of the large gear 13) that engages with the gear 17 or the gear 18, which engages with the large gear 13 rotated by a drive motor M of the drive source as shown in FIG. 15, FIG. 17A and FIG. 17B is provided on the inner circumference side of each of the trays 1 to 7 (a concave portion of the disc mounting portion is widely notched to the center thereof in order to set the reproduction unit 32) each having the fan-shaped form with identical shape and dimensions as the first tray 1 shown in the plan view in FIG. 14 and the perspective view in FIG. 15. In addition, the protruding portion 14 projecting downward from the center of a lower surface of the inner circumference side of the tray and convex portions 15 are provided for regulating a rotation path. The convex portions are provided in such a manner that one piece is horizontally protruding from the inner circumference side and two pieces are protruding from the outer circumference side of each of the trays. The inner gear 16 of the tray positioned at the top stage and the bottom stage is engaged with the gear 17 or the gear 18 of the drive source severally arranged at specified positions and is driven, and other trays that are not directly driven include the interlocking mechanism where the adjacent tray abuts and moves the side surface or the protruding portion 14 of the trays, and the sliding mechanism where each of the trays rotatively moves around the central shaft O while the convex portion 15 is supported on the paths R1 and R2 (refer to FIG. 5), the paths R1 and R2 being arranged along the inner and outer circumference sides of the trays, and is remaining horizontal.

The path R1 on the outer circumference side of the tray is formed on an upper end surface of a wall of the table, which faces the outer circumference side of the tray of the table 22. The path R2 on the inner circumference side is formed on the upper end surface of a ring 8 fixed around the central shaft O. It is needless to say that a height variation of the both paths R1 and R2 is formed in accordance with a process in which the height of the trays supported by the convex portions 15 of the trays abutting on the paths sequentially varies from the bottom stage (PP) to the first halfway stage (M1P), the middle stage (WP), the second halfway stage (M2P) and the top stage (EP) in order to keep the trays horizontal.

Note that a portion of the inner gear 16 of the trays 1 to 7 protrudes downward from the tray as shown in FIGS. 17A and 17B. The upper surface of the tray of this portion is in a concave state as shown in the perspective view of FIG. 5 so as to be overlapped with another tray. Moreover, in addition to the direct drive by the gear 18, the tray at the bottom stage (PP) is constituted such that the protruding portion 14 of the tray is fitted into one of five grooves 9 provided on the large gear 13 at the central shaft as shown in FIG. 15. With this constitution, the trays can be driven while their flip-flop movement is restrained.

The disc reproduction device 20 capable of holding seven discs on its tray having the same tray dimensions as that of the conventional carrousel type which holds five discs can be realized by the rotation drive mechanism including the foregoing driver.

Additionally, as shown in the above-described embodiment of the disc reproduction device 20, allowing the disc reproduction device of the carrousel type which normally holds five discs to hold seven discs is most effective because the seven discs can be held within the limit of allowable maximum dimensions for the disc reproduction device designed to hold discs of 12 cm diameter such as the CD and the DVD and also because two discs can be simultaneously exchanged. However, as it is clear that in a case where the constitution of the disc reproduction device of the present invention is designed for discs of a smaller diameter, it is matter of course that the device can be designed to hold eight or more discs.

In the embodiment, as shown by the arrows in FIG. 4, the trays from the first tray to the seventh tray are made to rotate clockwise. However, since it is clear from FIG. 4 that the trays are arranged symmetrically, rotation can be made either clockwise or counter-clockwise.

Since the disc reproduction device according to the present invention is constituted as described above, it has the effects described below.

(1) More discs can be held than the disc reproduction device of the carrousel type.
(2) Since the disc does not overlap with other discs at the reproduction position, reproduction is made safe and sure.
(3) Since the area above the disc at the disc exchange position is completely open, discs can be easily exchanged.
(4) With the width and depth dimensions of the conventional disc reproduction device holding five discs, it is possible for the disc reproduction system to hold seven CDs and DVDs.
(5) The damper can be fit within the entire thickness (the height from the top stage to the bottom stage) of the trays because the reproduction position is at the bottom stage. Thus, the thickness of the disc reproduction device can be controlled.

The entire content of Japan Patent Application P2000-261562 with a filling date of Aug. 30, 2000, is incorporated herein by reference.

Although the invention has been described above by reference to certain embodiments of the invention, the invention is not limited to the embodiments described above will occur to these skilled in the art, in the teachings. The scope of the invention is defined with reference to the following claims.

What is claimed is:

1. A disc reproduction device comprising:
   a plurality of disc mounting portions for holding discs arranged around a central shaft, which is rotatively moved by a rotation drive mechanism; and
   a reproduction unit, where said plurality of disc mounting portions are rotatively moved around the central shaft one stroke by one stroke, the one stroke being a movement of the disc mounting portion to a position of an adjacent disc mounting portion, and where the reproduction unit is set to reproduce the disc held in the disc mounting portion positioned on the reproduction unit,
   wherein said disc mounting portions include: independent trays divided for each disc; and driver for moving each of the trays horizontally or upward/downward obliquely in a parallel manner around the central shaft in each stroke such that each of said trays is at a bottom stage when being at a reproduction position on said reproduction unit and is not overlapping with other trays, is at a top stage when being at a disc exchange position, and is at a middle stage or the bottom stage during other standby state and a portion of the tray overlaps with an adjacent tray.

2. The disc reproduction device according to claim 1 comprising:

an inner gear formed on the inner circumference side of each of the trays, where each of the trays has a fan-shaped form with identical shape and dimensions, which engages with one of gears of a drive source;

a protruding portion projecting downward from a center of a lower surface of the inner circumference side of the tray; and a convex portion for regulating a rotation path, horizontally protruding from the inner and outer peripheral sides of the tray, which is provided as the driver for moving each tray horizontally or upward/downward obliquely in the parallel manner around the central shaft, wherein the inner gear of the tray positioned at the top stage and the bottom stage is engaged with one of the gears of the drive source severally arranged at specified positions and is driven, and other trays that are not directly driven include: an interlocking mechanism where the adjacent tray abuts and moves a side surface or the protruding portion of the tray; and a sliding mechanism where each of the trays rotatively moves around the central shaft while said convex portion is supported on the paths arranged along the inner and outer circumference sides of the tray and is remaining horizontal.

3. The disc reproduction device according to claim 2, wherein the tray positioned at the middle stage in the beginning of movement of one stroke and the tray to be moved to the middle stage comprise driver for providing a period of time in which the trays are still during the movement of the one stroke.

4. The disc reproduction device according to claim 1, wherein the tray positioned at the middle stage in the beginning of movement of one stroke and the tray to be moved to the middle stage comprise driver for providing a period of time in which the trays are still during the movement of the one stroke.

* * * * *